UNITED STATES PATENT OFFICE.

ADOLPHE BOUVIER, OF LYON, FRANCE.

APPARATUS FOR MIXING, MEASURING, AND CARBURETING GASEOUS BODIES.

No. 924,883.  Specification of Letters Patent.  Patented June 15, 1909.

Application filed September 29, 1906. Serial No. 336,725.

*To all whom it may concern:*

Be it known that I, ADOLPHE BOUVIER, of 25 Avenue de Noailles, Lyon, France, engineer, have invented a new and useful Improvement in Apparatus for Mixing, Measuring, and Carbureting Gaseous Bodies, which improvement is fully set forth in the following specification.

The object of the present invention is an apparatus capable of supplying two or more currents of gaseous fluids at a strictly constant predetermined pressure, the volumes of the different gases delivered being in a predetermined proportion and which thus allows of mixtures of different gases or vapors of volatile liquids to be obtained in a given proportion or description.

The apparatus is designed to produce, principally for lighting or for intense heating by means of gas, a given combustible mixture of gas and air delivered at the time it is used under constant pressure, the air and the gas being mixed in a proportion which can be regulated at will but which remains quite constant after being regulated. This result is obtained in the present apparatus by means of two pumps connected together and giving the necessary deliveries for the final mixture and each delivering its fluid into a special reservoir at constant pressure either for example in a rising and falling gasometer of constant weight, or into a closed stationary airtight gasometer of constant volume. The amount of the two fluids delivered is simultaneously regulated by two independent arrangements, operated by the extreme positions of the rising and falling gasometers or by the maximum pressures in the stationary reservoirs, acting on the inlet valves of the two pumps in such a way that the two fluids are delivered at the outlet of the gasometers, under a certain predetermined constant pressure, whereby the two fluids arrive in proportional quantities and under the same pressure at and pass into a mixer and from there to the burners. From the mixer the two fluids, now mixed in a single stream pass through a pipe consisting of cones connected together, suitably arranged and open and at an angle of about 7° and provided with metal gauze or other suitable arrangements ending in pipes of small diameter which conduct the mixture to the different burners. There the mixture is burned either in a blue flame or in a white flame. From the nature of the present apparatus it is possible to have an oxidizing, neutral or reducing flame and to keep it constant and unchanged thus causing it to approach as nearly as possible to the maximum thermal efficiency.

Figure 1:
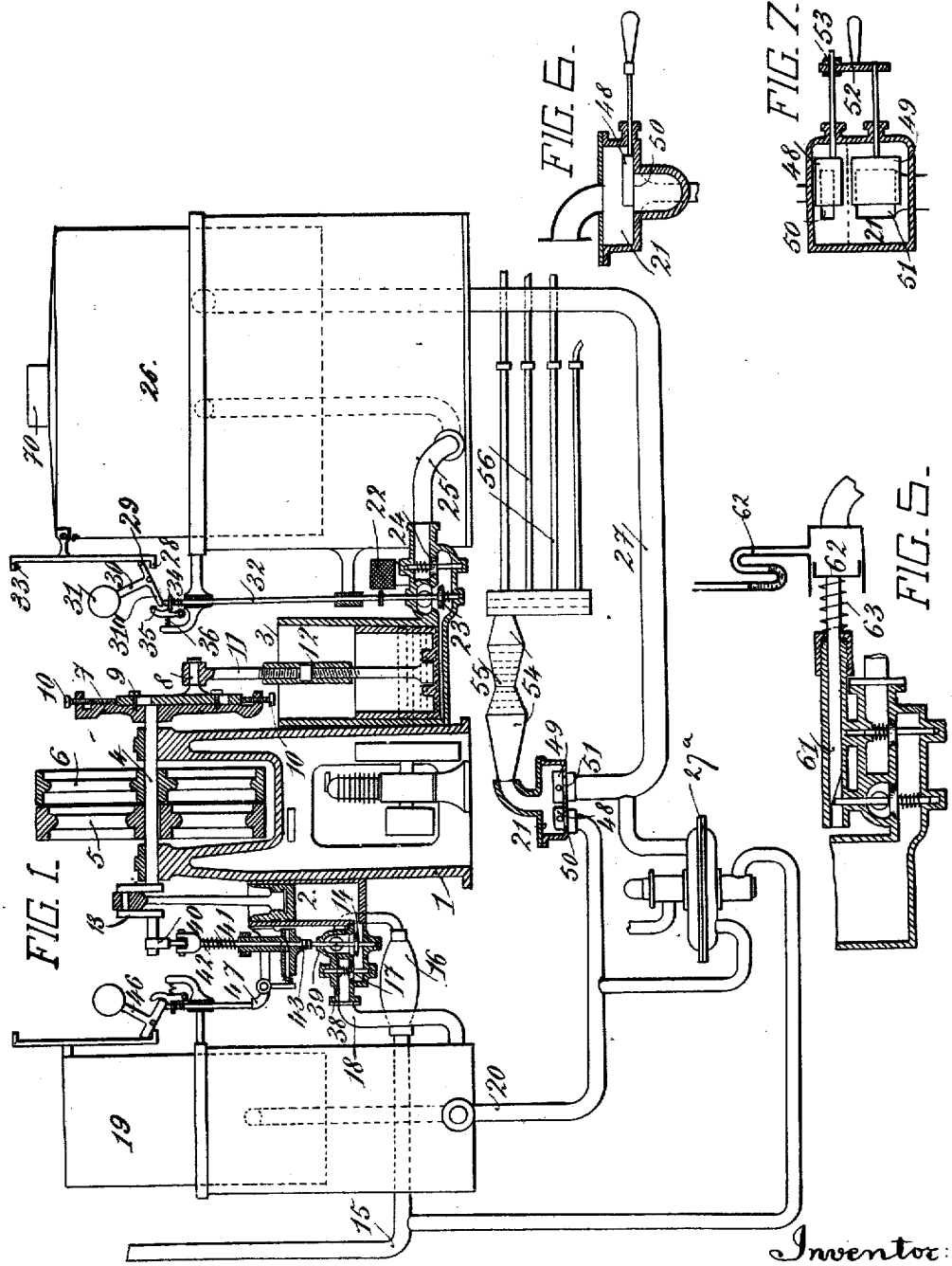
Figure 2:
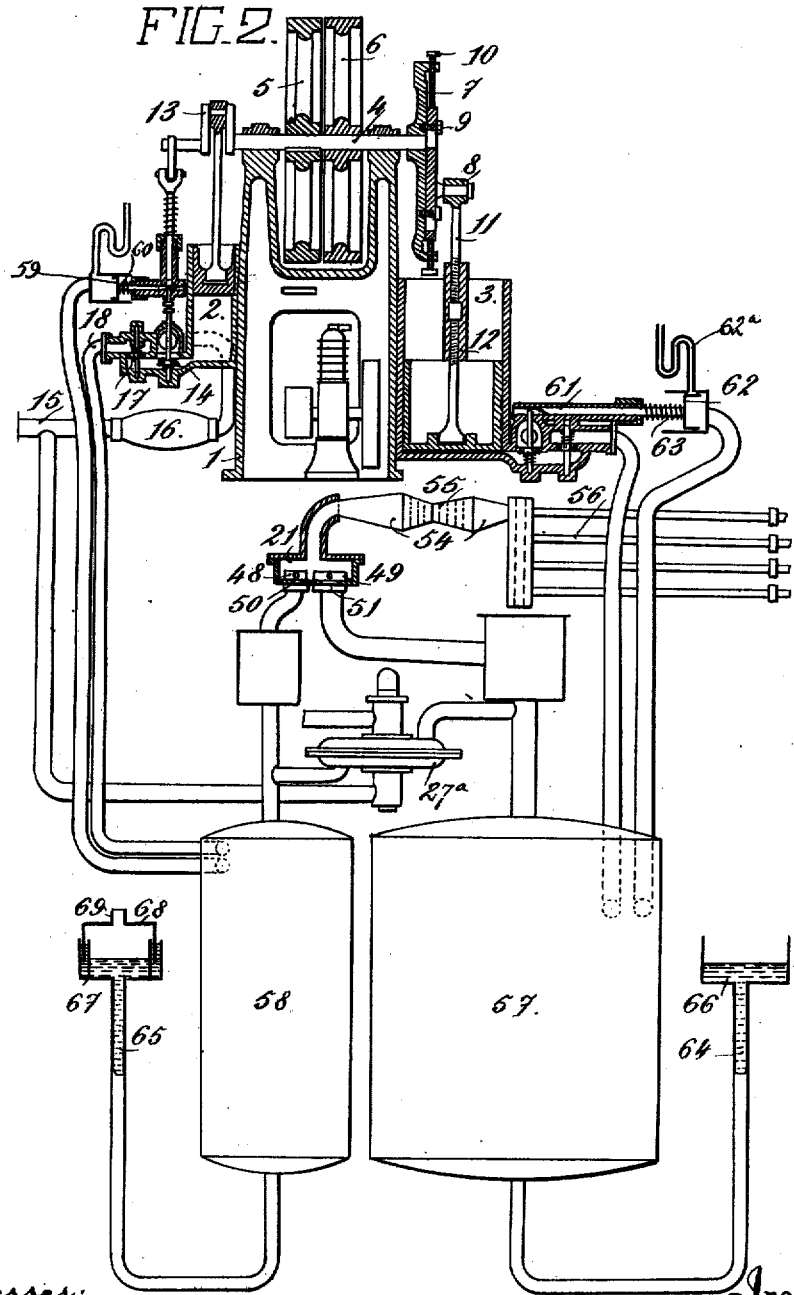
Figure 3:
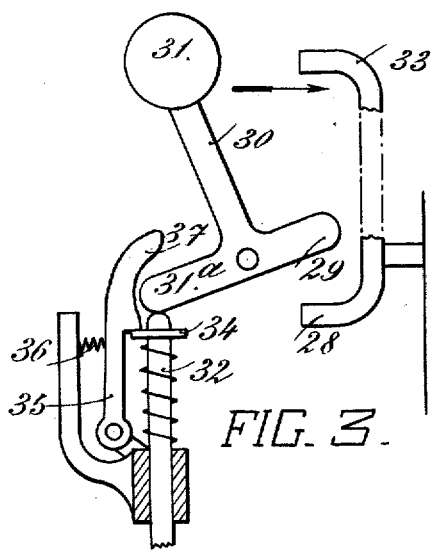
Figure 4:
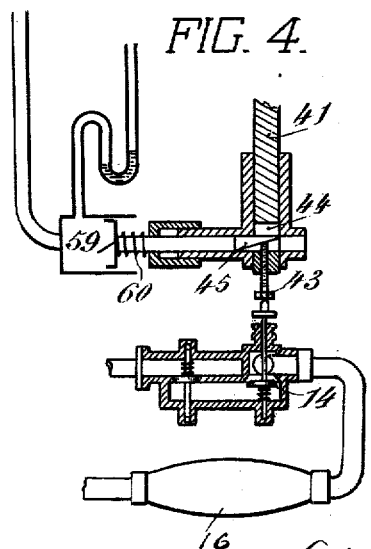

In the drawings which show an example of carrying out the invention: Figure 1 is a general view partly in section of one form of apparatus with a rising and falling gasometer. Fig. 2 is a general view of the apparatus with reservoirs having a constant volume. Fig. 3 is an elevation to a larger scale of the rocking lever controlling the inlet valve of the air pump where rising and falling gasometers are used. Fig. 4 is a section on a large scale of the mechanism for regulating the gas pump when reservoirs of constant volume are employed. Fig. 5 is a similar view of the mechanism for regulating the air pump. Figs. 6 and 7 show the mixing chamber.

In the form shown in Fig. 1 on one or two supports 1 are mounted a gas pump 2 and an air pump 3, these two pumps can be actuated either by a single crank shaft 4 driven by fast and loose pulleys 5 and 6 or by two independent shafts or by any other mechanism capable of giving a reciprocating movement to the two pistons. A small gas or internal combustion motor for example fired by an ignition tube or otherwise, or a motor with two cylinders driven by a liquor under pressure can be arranged inside the support as is shown in Fig. 1 to drive the apparatus direct through a suitable clutch. The cylinder of the pump 2 is of fixed capacity, that of 3 is variable as will be hereinafter explained, the ratio between the maximum capacities of the pumps 2 and 3 being so arranged in the construction as to be able to supply the least amount of combustible gas wanted for the mixture.

The variation of the capacity of the cylinder of the air pump can be obtained by any suitable means such as the arm of a variable lever or a double eccentric with an intermediate neutral position, or again, as is shown in the drawing by a crank plate on which the crank pin 8 can be displaced radially and fixed by screws 9 and 10. It is advantageous in order to keep the amount of compression constant to make the connecting rod 11 adjustable so that it can be lengthened by for instance a right and a left hand threaded rod working in a sleeve 12. The piston of the gas pump 2 driven by the crank 13, draws the gas through the mechanically operated valve 14 in the gas pipe 15 in which is placed a regulating vessel 16. It forces the gas through the valve 17 and the pipe 18 to the bell 19 of a rising and falling gasometer. From there the gas passes by the pipe 20 to the mixing chamber 21. On the other hand the air drawn by the piston of the air pump 3 through the intake 22 and the automatic valve 23 is forced through the valve 24 and the pipe 25 to the bell 26 of a rising and falling gasometer. From there the air passes by the pipe 27 to the mixing chamber 21. A relief device 27ª is connected on the one hand to the gas supply 15 and delivery 20 and on the other hand to the atmosphere and to the air delivery 27.

The weights of the air and gas gasometers are calculated so that the pressure of the two fluids at the point of delivery shall be the same. Now the constants of the pumps, the volume of the cylinder and the number of strokes of the piston in a unit of time, are such that the quantities of gas and air sent into the respective gasometers are greater than those which are necessitated by the maximum consumption of the apparatus constructed for any given installation. After a time therefore the bells of the gasometers will be raised to their full height. In order to keep the pressure at its working value the bells act respectively on the inlet valves of the pumps in such a way as to keep them open and so compel the pumps to work idly. For this purpose the gasometer for the air carries a lug 28 which acts on the arm 29 of a rocking lever 30 having a counterweight 31 (Figs. 1 and 3). This lever, as soon as the counterweight 31 has passed the vertical, presses down by its arm 31ª the stem 32 of the valve 23. The air pump now works idly and the air is supplied to the mixing chamber 21 from the bell only. When the bell comes to its lowest position it acts by means of a second lug 33 on the arm 29 of the rocking lever whose counterweight 31 moving past the vertical to the other side frees the stem 32 of the valve 23, which, actuated by its spring, returns to its seat and comes again into action the air pump resuming its normal work.

It is necessary to provide a special arrangement to prevent the inlet valve 23 from being able to start working again before the counterweight 31 has passed the vertical to the other side, for in this case if the pump commenced to work, the bell would move upward and the regulation would be unstable by reason of the renewed holding open of the inlet valve which would result from this movement. It is possible, if it is desired, to work a regulator of this kind continuously which would have the effect of reducing the range of the bell, but it is preferable to allow the bell its whole range. In order to effect this the stem 32 of the valve 23 is provided with a collar 34 with which engages, when the rocking lever falls, a catch 35 actuated by a spring 36 and having a nose 37. In this way when the arm 31ª of the rocking lever rises, the valve 23 is held open by the catch 35; then when the counterweight 31 has passed the vertical the arm 31ª pushes aside the nose 37 of the catch which frees the valve 23, the bell then moves upward, the regulation having been made stable. The bell of the gasometer for the gas works in a similar way, by means of a duplicate set of lugs and counterweighted lever, but, as the stem 38 of the inlet valve for the gas must have a gastight packing gland 39 it is necessary to operate it mechanically. The main driving shaft of the gas pump 4 carries a cam 40 which acts on the rod 41 pressed by a spring 42. At the end of this rod is screwed the head 43 which actuates the valve 14 (Figs. 1 and 4). The rod 41 has in it a slot 44 in which can be inserted a wedge 45 actuated by the rocking lever 46 through the bell crank lever 47. The slot 44 is long enough for the wedge 45 not to in any way normally interfere with the movement of the rod 41. But it will be seen that if the wedge 45 is pushed in by the rocking lever 46 the lower end of the slot in the rod 41 will come against this wedge and consequently with a sufficient movement of the said wedge the valve will remain open, so that the gas pump will work idly. The opposite movement of the rocking lever will free the rod 41 and consequently the valve 14 which will again be actuated by the cam 40. This arrangement admits of alternately filling and emptying gasometers at a substantially constant pressure which will result in a flow of air and gas to the mixing chamber 21 also at constant pressure. The mixture at this point can be finally controlled as to volume by means of an arrangement consisting of two slide valves 48, 49 (Figs. 1, 2, 6 and 7) regulating simultaneously the opening of the passages of two parts 50 and 51 of which the width of each is proportional to the quantity of fluid which ought to pass it and whose total section corresponds to the maximum quantity admitted. The two slide valves are connected together by a crosshead 52 with a handle, but the relative positions of the two slide valves can be altered by means of screws 53. Thus it is possible to vary the quantity without in any way altering the proportions and also to correct or modify the proportions by the adjustment of the screw 53. The gas then enters the mixing chamber proper 54 which consists of a series of converging and diverging cones 55 provided with diaphragms of metal gauze which completes the mixing of the gas. From there the complete and homogeneous mixture is delivered through pipes of small diameter 56. In the case of burners of large capacity metal gauze may in addition be interposed immediately before the burners. The metal gauze can be replaced by a cluster of almost capillary tubes.

When it is considered preferable to use as gasometers stationary reservoirs of constant volume instead of rising and falling gasometers, the pumps 2 and 3 force the two fluids into the closed reservoirs 58, 57 (Fig. 2) where an increase in the quantity of the gas introduced will result in an increase of pressure and a depletion, however slight, will result in a decrease of the pressure. These variations of pressure are utilized to effect the regulation. To effect this, the fluid under pressure acts on a wedge as shown in Figs. 2 and 4 for regulating the gas in every way similar to that of the preceding case: This action is effected by means of a piston 59 acted on by a spring 60 and communicating with the gas reservoir 58 or by means of a membrane working in the same way as the piston. The air inlet valve is also pressed down or left free by a wedge 61 operated by a piston 62 acted on by a spring 63 and communicating with the air reservoir 57. By proportioning the surfaces of the pistons to the degree of sensitiveness which is desired, and by compensating the thrust of the pistons by adjustable springs the working of the pumps can be stopped and started by the filling and depletion at any suitable time. The cylinders containing these pistons can each be provided with a pressure gage 62ª open to the air or an aneroid to make it easier to regulate the pressures. Here as in the former cases a relief device may be employed. It would be equally possible to act on the inlet valves of the pumps 2 and 3 by means of any other appliance capable of being actuated by the pressure of the fluid accumulated in the reservoir, the appliance being either solid or liquid. The closed reservoirs are also furnished either with drain cocks or with inverted siphon pipes 64 and 65 whose function it is to automatically drain away the water or other condensed liquids. To effect this the openings (Fig. 2) of the long legs of the siphon widen out into cups 66, 67 the bottom of which is at such a distance above the bottom of the reservoir as will give a column of liquid of a height corresponding to the maximum pressure which should be obtained.

In case of excess of pressure the liquid will be forced into the cup whose capacity is sufficient to contain the liquid in the short leg of the siphon. Under these conditions the fluid can escape and get away either into the atmosphere in the case of the air—or in the case of the gas, into a bell 68 with a seal of liquid such as mercury. The top of this bell is connected by a tube 69 to the gas pipe or to the reserve of uncompressed gas serving to supply the pump (india rubber bag). All loss of gas will thus be avoided and the siphon will work as a safety valve.

If the water or other products of condensation increase in volume they will pass out of the cups 66, 67 by a suitable tube into the atmosphere in the case of the air. The second adjusting of the proportions of the fluids immediately before being mixed in the mixing chamber is obtained in the same way as in the preceding case.

Whether an apparatus having rising and falling gasometers or stationary reservoirs be used the equalization of the mixture will be effected primarily by equal weights of the gasometer bells, but if it be granted that the resistance of pipe 27 remains constant and that the section of the ports 51 ought to remain practically the same in order to insure that the regulating effect of the slide valves shall be the same for a given delivery it follows that the pressure in the bell 26 or in the reservoir 57 ought to become different in order to secure the desired delivery into the mixing chamber. The bell 26 should therefore be surcharged with a weight 70 or lightened and the drain pipe of the reservoir 57 ought to allow of a greater height of liquid; at the same time the tension of the springs 60 and 63 of the regulating mechanism (Figs. 2, 4 and 5) should be brought to the tension value corresponding to the new conditions for working.

The form and the particular arrangements of the different modifications of the present apparatus will naturally vary according to the volume of gas delivered and to the internal pressure and also according to the nature of the products used. It is evident that the apparatus designed to deliver simultaneously a current of pure air and a current of air saturated at a given temperature with the vapor of a hydrocarbon liquid with the object of eventually obtaining, by the mixture of these two currents, carbureted air of a given strength will require special details, but the general principles of the invention previously described will be the same.

Having thus fully described my invention what I claim as new is:

1. An apparatus for supplying two or more gases in predetermined proportions, comprising a pump for each gas, a storage reservoir fed by each pump, means controlled by the filling and depletion of each reservoir to throw its pump out of and into operation, and pipes leading from each reservoir to a point of junction.

2. An apparatus for supplying two or more gases in predetermined proportions, comprising a pump for each gas, a storage reservoir fed by each pump, means controlled by the filling of each reservoir to hold the inlet valve of its pump in an open position to cause the pump to run idly, means controlled by the depletion of each reservoir to restore the inlet valve of its pump to its normal position, and pipes leading from each reservoir to a point of junction.

3. An apparatus for supplying two or more gases in predetermined proportions, comprising a pump for each gas, a gasometer fed by each pump, each gasometer having a capacity proportioned to its contribution to the supply, means actuated near the upper limit of each gasometer movement to throw its pump out of operation, means actuated near the lower limit of the gasometer movement to throw its pump again into operation, and pipes leading from each reservoir to a point of junction.

4. An apparatus for supplying two or more gases in predetermined proportions, comprising a pump for each gas, a gasometer fed by each pump, lugs carried by each gasometer bell one above the other, an angle lever pivoted near the bell with one of its arms in the path of the rising and falling lugs and with another arm arranged to bear upon the inlet valve stem of the pump supplying said gasometer, the arrangement being such that near the upper limit of movement of the bell, the lower lug will engage the angle lever and through it hold the inlet valve open and near the lower limit of its movement, the upper lug will engage the angle lever and tilt the same to release the inlet valve, and pipes leading from each reservoir to a mixer, and a pipe leading from a point of junction.

5. An apparatus for supplying two or more gases in predetermined proportions, comprising a pump for each gas, a gasometer fed by each pump, a slotted rod bearing upon the inlet valve of one of the pumps, a cam driven by the pump and bearing upon the slotted rod to mechanically operate the valve, a wedge arranged to enter the slot, a lever arranged to move the wedge, lugs carried by the gasometer bell fed by said pump, an angle lever arranged with one of its arms in the path of the rising and falling lug and its other arm operatively connected with the first named lever, whereby the rising of the bell serves to hold the inlet valve of the pump open and the falling of the bell serves to restore said valve to its normal operative position.

6. An apparatus for supplying two or more gases in predetermined proportions, comprising a gas supply and an air supply, a gas pump of fixed capacity, an air pump of regulable capacity, and gasometers fed by the pumps and having relative capacities of storage and delivery corresponding to those of the respective pumps.

7. An apparatus for supplying two or more gases in predetermined proportions, comprising a gas supply and an air supply, a gas pump of fixed capacity, an air pump, means to adjust the stroke of the piston in the air pump to vary its capacity, and gasometers fed by the pumps and having relative capacities of storage and delivery corresponding to those of the respective pumps.

8. An apparatus for supplying two or more gases in predetermined proportions, comprising a gas supply and an air supply, a gas pump of fixed capacity, an air pump of regulable capacity, gasometers fed by the pumps and having relative capacities of storage and delivery corresponding to those of the respective pumps, and means actuated near the upper and lower limits of movement of the gasometer to throw their respective pumps out of and into operation.

9. An apparatus for supplying two or more gases in predetermined proportions, comprising a gas pump with fixed capacity, an air pump with regulable capacity, gasometers fed by the pumps and having relative capacities of storage and delivery corresponding to those of the pumps, and means to adjust the pressure in the air gasometer.

10. An apparatus for supplying two or more gases in predetermined proportions, comprising a gas supply and an air supply, a gas pump of fixed capacity, an air pump of regulable capacity, gasometers fed by the pumps and having relative capacities of storage and delivery corresponding to those of the respective pumps, and regulable means actuated near the upper and lower limits of movement of the gasometer to throw their respective pumps out of and into operation.

11. An apparatus for supplying two or more gases in predetermined proportions, comprising a gas pump of fixed capacity, an air pump, means to vary the throw of the air pump piston, gasometers fed by the pumps and having capacities of storage and delivery less than the delivery capacity of their respective pumps, lugs carried by each of the gasometer bells one above the other, angle levers pivoted adjacent to the bells with one arm in the line of travel of the lugs, the inlet valve of the air pump arranged adjacent to the other arm of the angle lever of the air gasometer, a slotted rod bearing upon the stem of the inlet valve of the gas pump, a cam on a drive shaft bearing upon the rod to operate the inlet valve, a wedge arranged to enter the slot, an operative connection between the angle lever of the gas bell and the wedge, and a catch arranged to hold each of the inlet valves open and to be released by the tilting of the angle levers to permit said valves to close whereby the filling and depletion of the gasometers serve to throw their respective pumps out of and into operation.

In testimony whereof I have signed this specification in the presence of two subscribing witnesses.

ADOLPHE BOUVIER.

Witnesses:
FRANCIS B. KEENE,
L. H. MUNIER.